United States Patent
Russell et al.

(10) Patent No.: US 7,631,717 B2
(45) Date of Patent: Dec. 15, 2009

(54) BREAK-AWAY LICENSE PLATE SUPPORT FOR A MOTORCYCLE

(75) Inventors: Craig P. Russell, Milwaukee, WI (US); Richard J. Christoph, Wadwatosa, WI (US); Michael R. Medina, Brookfield, WI (US); Steven W. Osgood, Campbellsport, WI (US); Tyler T. Rosenberg, Cedarburg, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 369 days.

(21) Appl. No.: 11/627,819

(22) Filed: Jan. 26, 2007

(65) Prior Publication Data

US 2008/0179486 A1   Jul. 31, 2008

(51) Int. Cl.
*B62K 11/00* (2006.01)
*G09F 7/22* (2006.01)
*B60R 19/02* (2006.01)

(52) U.S. Cl. .................. 180/219; 40/211; 293/105
(58) Field of Classification Search .............. 224/412, 224/413, 443, 445, 451; 40/200, 208, 209, 40/210, 211, 606.14, 606.15; 293/105; 180/219
See application file for complete search history.

(56) References Cited

U.S. PATENT DOCUMENTS

| | | | | |
|---|---|---|---|---|
| 2,550,325 A | * | 4/1951 | Breed | 248/284.1 |
| 2,787,433 A | * | 4/1957 | Slavsky et al. | 248/231.71 |
| 2,916,842 A | * | 12/1959 | Mushynski | 40/202 |
| 3,286,891 A | * | 11/1966 | Jones, Jr. | 224/455 |
| 4,422,659 A | * | 12/1983 | Nebu | 280/152.1 |
| 4,909,464 A | * | 3/1990 | Levine et al. | 248/220.22 |
| 6,120,167 A | * | 9/2000 | Nace | 362/473 |
| 6,592,137 B2 | | 7/2003 | Grove | |
| 7,073,618 B1 | * | 7/2006 | Song | 180/219 |
| 7,104,157 B1 | * | 9/2006 | Hilliard | 74/564 |
| 2002/0029917 A1 | * | 3/2002 | Galbraith et al. | 180/219 |
| 2003/0001360 A1 | * | 1/2003 | Hotch | 280/301 |

* cited by examiner

*Primary Examiner*—Lesley Morris
*Assistant Examiner*—Daniel Yeagley
(74) *Attorney, Agent, or Firm*—Michael Best & Friedrich LLP (57) ABSTRACT

A motorcycle license plate support including a coupling portion and a support portion. The coupling portion is coupled to a rear fender of the motorcycle and includes a display surface that is visible through an aperture defined by the rear fender. The support portion depends from the coupling portion and includes first and second projections that house portions of a detent assembly. A coupling member is pivotably coupled to the support portion by the detent assembly and includes a first portion engaging the detent assembly and a second portion that is movably coupled to the first portion. The second portion is moveable to adjust a length of the coupling member to accommodate differently sized license plates, and the coupling member is pivotable with respect to the support portion between extended and folded positions.

25 Claims, 8 Drawing Sheets

BREAK-AWAY LICENSE PLATE SUPPORT FOR A MOTORCYCLE

BACKGROUND

The present invention relates to a break-away license plate support for a motorcycle.

Motorcycles, like most road-going vehicles, are generally required to display a government-issued license plate. Such license plates are commonly required to be visible from the rear of the motorcycle, and must be mounted accordingly. In this regard, many motorcycles are provided with a license plate bracket attached or otherwise coupled to a rear fender of the motorcycle to properly display and support the license plate.

SUMMARY

The present invention provides a license plate support member for a motorcycle in which the license plate extends laterally from one side of the vehicle. The license plate support is pivotable between an extended position and a folded position, and is held in position by a detent assembly. In some embodiments, the license plate support can be folded both forwardly and rearwardly.

More specifically, various embodiments of the present invention provide one or more of a motorcycle, a fender assembly, and/or a license plate support for a motorcycle. The motorcycle includes a frame having a front end and a rear end, the rear end including a fender support. The motorcycle also includes a front wheel supporting a front end of the frame, and a rear wheel supporting a rear end of the frame. The fender assembly is coupled to the fender support and, when coupled to the motorcycle, extends over at least a portion of the rear wheel.

The fender assembly includes a fender coupled to the fender support and also includes the license plate support member. The fender includes an inner surface and an outer surface, and defines a fender well and a display aperture. The license plate support member includes a coupling portion that is coupled to at least one of the fender, the fender support, and the frame. The support member also includes a support portion that depends from the coupling portion, a detent assembly supported by the support portion, and a coupling member pivotably coupled to the support portion by the detent assembly. In some embodiments, the coupling portion includes a display surface positioned in the fender well and visible through the display aperture.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
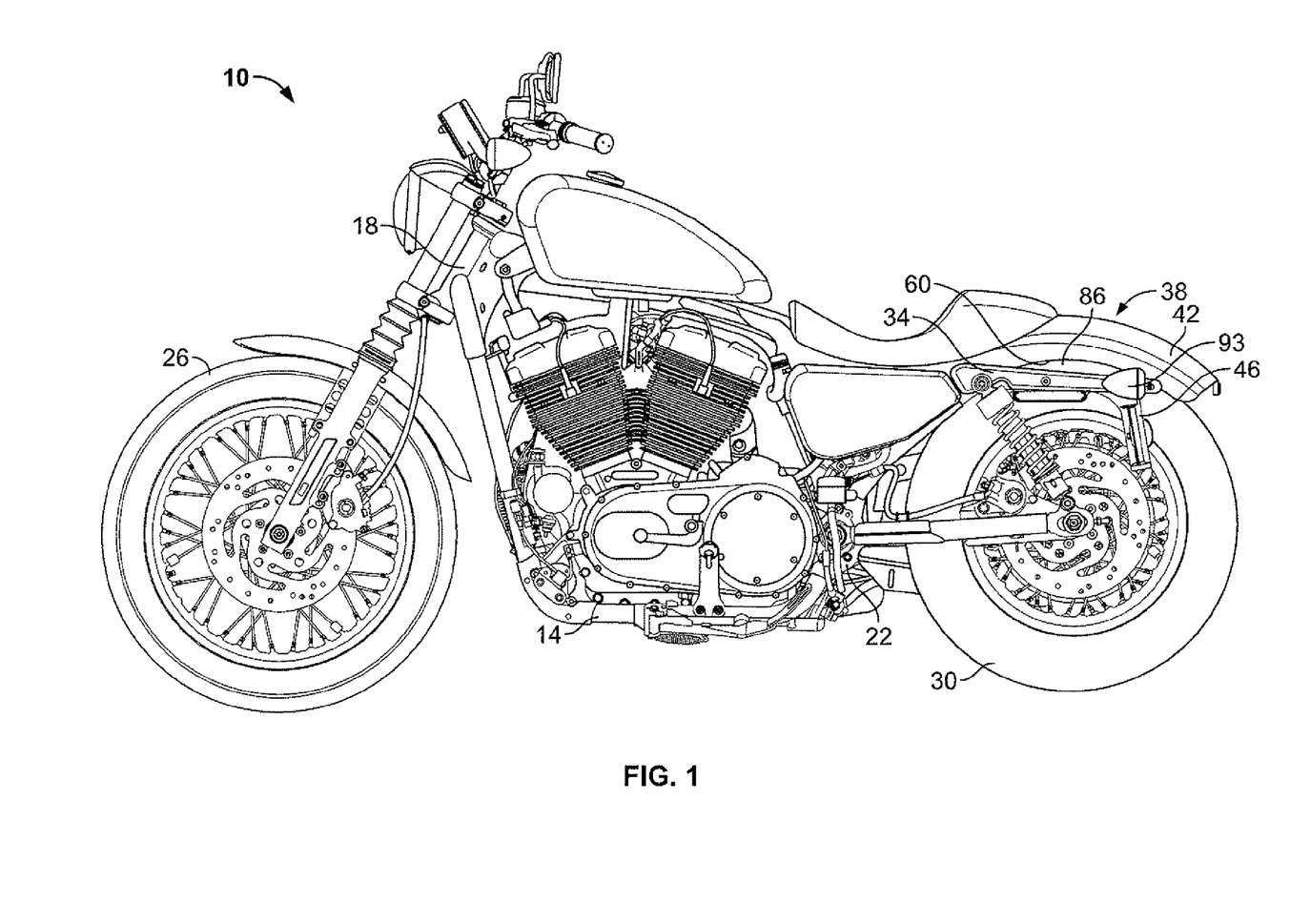
FIG. 1 is a side view of a motorcycle embodying the invention.

FIG. 1 illustrates a motorcycle 10 including a frame 14 having a front end 18 and a rear end 22. A front wheel 26 supports the front end 18 of the frame 14 and a rear wheel 30 supports the rear end 22 of the frame. The rear end 22 of the frame includes a fender support 34 that supports a rear fender assembly 38. The rear fender assembly 38 extends over and partially around the rear wheel 30.

Figure 2:
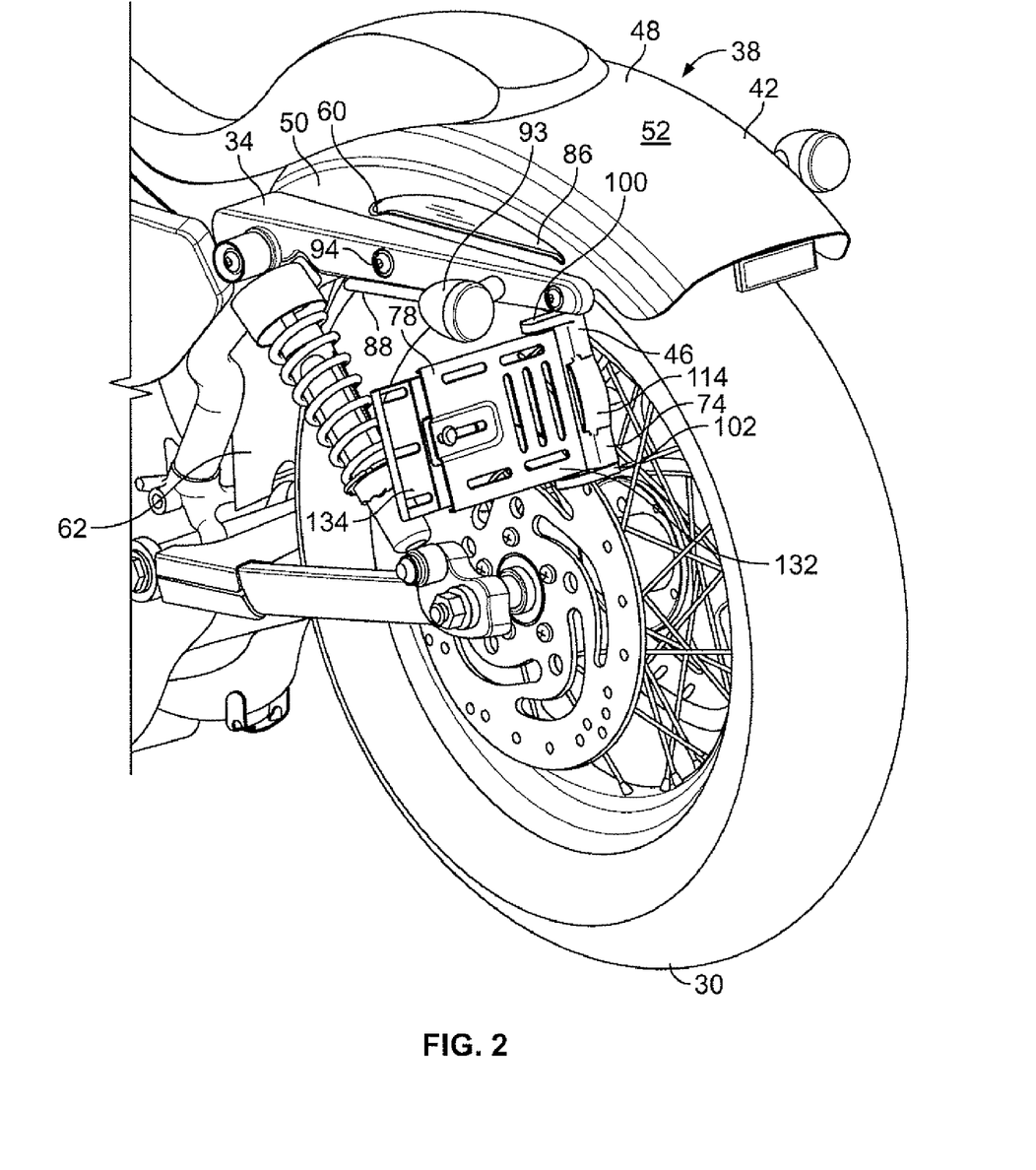
FIG. 2 is a perspective view of a rear portion of the motorcycle of FIG. 1.
Figure 3:
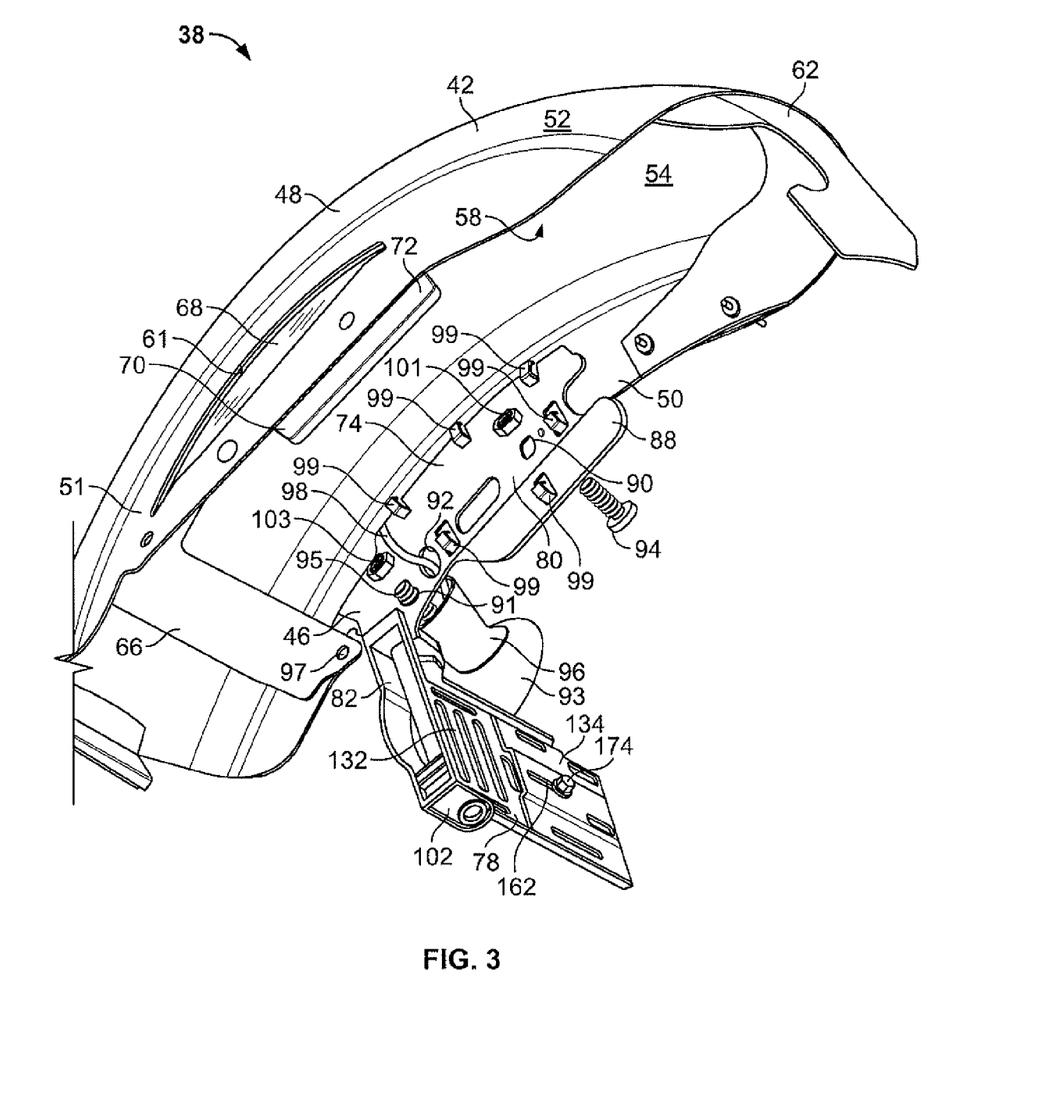
FIG. 3 is a perspective view of an underside of a fender assembly of the motorcycle of FIG. 1.

Referring also to FIGS. 2 and 3, the rear fender assembly 38 includes a fender 42 coupled to and supported by the fender support 34, and a license plate support 46 coupled to and supported by the fender 42 and the fender support 34. The fender 42 includes a curved upper portion 48, substantially planar side portions 50, 51, an outer surface 52, and an inner surface 54. The inner surface 54 defines a fender well 58 that faces generally downwardly toward the rear wheel 30, and each side portion 50, 51 defines a respective display aperture 60, 61.

A mud guard 62 is coupled to a forward portion of the fender 42 and engages the inner surface 54. The mud guard 62 extends downwardly from the fender 42 in front of the rear tire 30 to divert water and debris collected by the fender 42 downwardly toward the roadway. A rear fender brace 66 is coupled to a rear portion of the fender 42 and also engages the inner surface 54. The rear fender brace 66 includes a display portion 68 that is visible through the display aperture 61 when the motorcycle 10 is viewed from the right-hand side. In some embodiments the display portion 68 is painted or otherwise colored black to provide the appearance that the rear tire of the motorcycle is visible through the display aperture 61. The rear fender brace 66 also includes a depending portion 70 that extends downwardly from the side portion 51 that provides a reflector surface 72. The reflector surface 72 may itself be reflective or may provide support for a reflective element (not shown) that may be coupled thereto.

Figure 4:
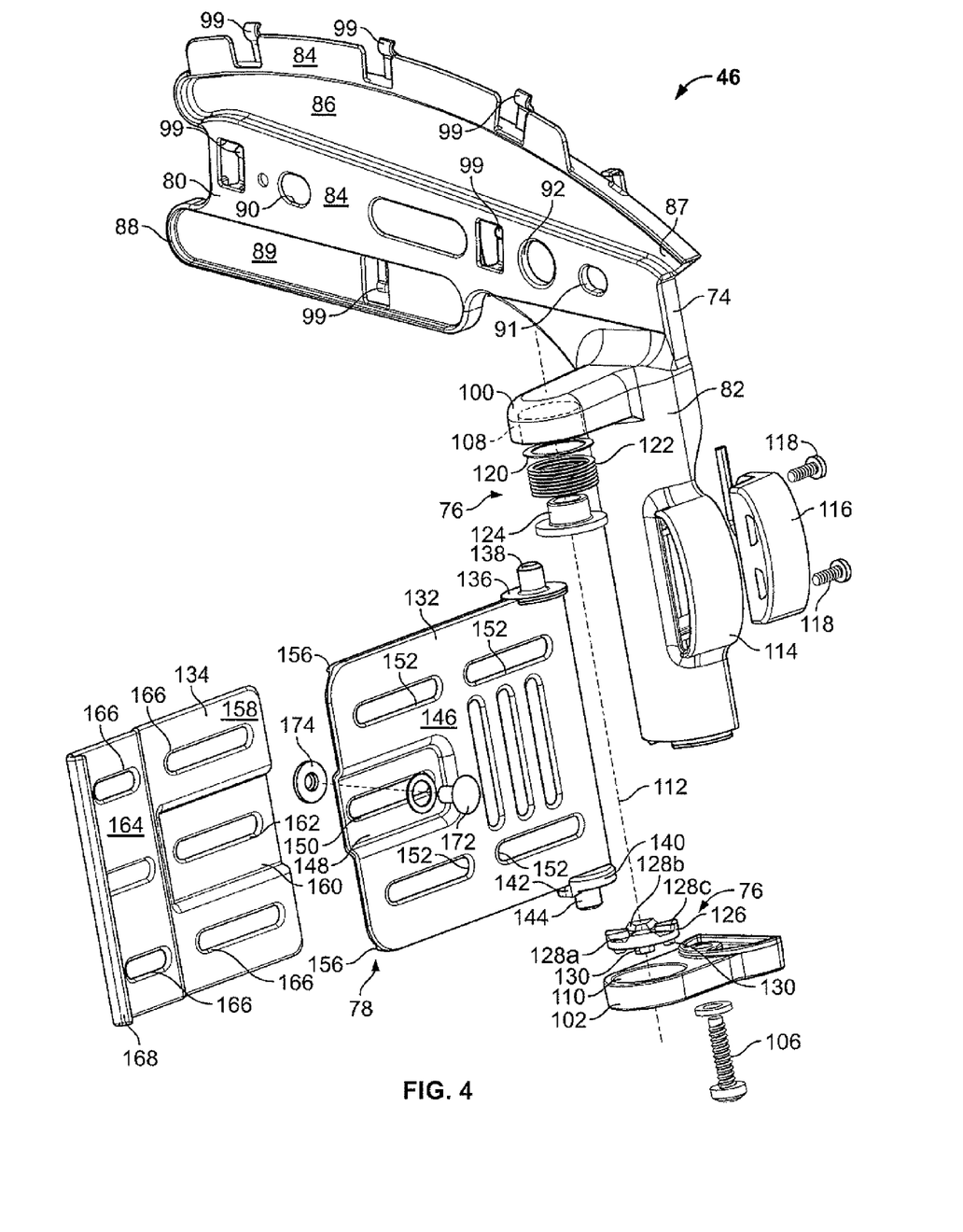
FIG. 4 is an exploded perspective view of a license plate support of the motorcycle of FIG. 1.

Referring also to FIG. 4, the license plate support 46 includes a generally L-shaped support member 74, a detent assembly 76, and a coupling member 78. The support member 74 includes a coupling portion 80 that is coupled to the inner surface 54 of the fender 42, and a support portion 82 that depends from the coupling portion 80 and supports the detent assembly 76 and the coupling member 78.

The coupling portion 80 includes a mounting surface 84 that faces and engages the inner surface 54 of the fender 42 when the support 46 is coupled to the motorcycle 10. The coupling portion 80 also includes a display surface 86 that is recessed with respect to the mounting surface 84. As shown in FIG. 2, the display surface 86 is visible through the display aperture 60 in the side portion 50 of the fender 42 when the support 46 is coupled to the motorcycle 10. The mounting surface 84 substantially surrounds the display surface 86 with the exception of a small, rearwardly positioned area 87 that allows moisture (e.g. rainwater) and debris to be channeled into the fender well 58.

The coupling portion 80 also includes a reflector mount 88 providing a reflector surface 89 that extends below the fender 42 when the support 46 is coupled to the motorcycle 10. The reflector surface 89 may itself be reflective, or may provide a mounting surface to which a reflective element may be attached by adhesive, fasteners, or the like. The coupling portion 80 defines first and second mounting apertures 90, 91, for mounting the support 46 to the fender 42, and a wiring aperture 92 through which wiring for a turn signal assembly 93 may be routed, as discussed further below.

In the illustrated construction the coupling portion 80 is coupled to the fender 42 and to the fender support 34 by a first fastener 94 that extends through the fender support 34, through an opening in the fender 42, and through the first mounting aperture 90. The first fastener 94 threads into a nut 101 that engages the coupling portion 80 on a side opposite the mounting surface 84. The coupling portion 80 is also coupled to the fender 42 and the fender support 34 by a mounting projection 95 that extends from a stem portion 96 of the turn signal assembly 93. The mounting projection 95 extends through the fender support 34, through an opening in the fender 42, and through the second mounting aperture 91 in the coupling portion 80. Like the first fastener 94, a nut 103 is threaded onto the mounting projection 95 and tightened against the coupling portion 80 on a side opposite the mounting surface 84. A second fastener (not shown) extends through the fender support 34, through the fender 42, and through an opening 97 in the rear fender brace 66, and is likewise secured with a nut (not shown). The first fastener 94 and the mounting projection 95, in addition to coupling the coupling portion 80 to the fender support 34 and the fender 42, also function to couple the fender 42 to the fender support 34

The turn signal assembly 93 includes wires 98 that provide electrical power to the lighting element of the turn signal assembly 93. The wires 98 extend from the stem portion 96 and are routed through openings in the fender support 34 and the fender 42, and through the wiring aperture 94 in the coupling portion 80. In the illustrated construction, the coupling portion 80 is provided with generally L-shaped wire guides 99 positioned and configured to rout the wires 98 along the inner surface 54 of the fender 42.

The support portion 82 of the support member 74 includes first and second spaced-apart projections 100, 102 that extend outwardly from the support portion 82 in substantially parallel relation to one another. In the illustrated construction, the first projection 100 is integrally formed with the support portion 82, and the second projection 102 is coupled to a distal end 104 of the support portion 82 by a screw 106. The first projection 100 defines a generally cylindrical downwardly-facing first cavity 108 that receives a portion of the detent assembly 76. The second projection 102 defines a generally cylindrical upwardly-facing second cavity 110 that opens toward the first cavity 108 and receives a different portion of the detent assembly 76. The first and second cavities 108, 110 together define a pivot axis 112 about which the coupling member 78 pivots, as discussed further below.

The support portion 82 also defines a light housing 114 that receives a lighting assembly 116. The lighting assembly 116 is operable to illuminate the area of the coupling member 78 and, more specifically, to illuminate a license plate 117 (FIG. 6) coupled to the coupling member 78. In the illustrated construction, the lighting assembly 116 is coupled to the light housing 114 by a pair of screws 118.

The detent assembly 76 includes a washer 120, a spring 122, and a collar 124 that are received by the first cavity 108, and a cam member 126 that is received by the second cavity 110. As discussed further below, the spring 122 biases the collar 124 generally downwardly, thereby biasing the coupling member 78 downwardly against the cam member 126. The cam member 126 includes cam recesses 128a, 128b, 128c that open generally upwardly and locking projections 130 that extend generally downwardly. The locking projections 130 engage locking recesses (not shown) provided in the second cavity 110 to substantially prevent rotation of the cam member 126.

In other constructions, the cam member may be formed integrally with the second projection 102 or may be rotationally fixed with respect to the second projection 102 in other ways. The illustrated detent assembly 76 is merely one example of a series of components that may be provided to afford detent pivoting movement of one component with respect to another. It should be appreciated that the support portion 82 and the coupling member 78 can both be modified for use with other types of detent assemblies without departing from the spirit and scope of the present invention.

Figure 5:
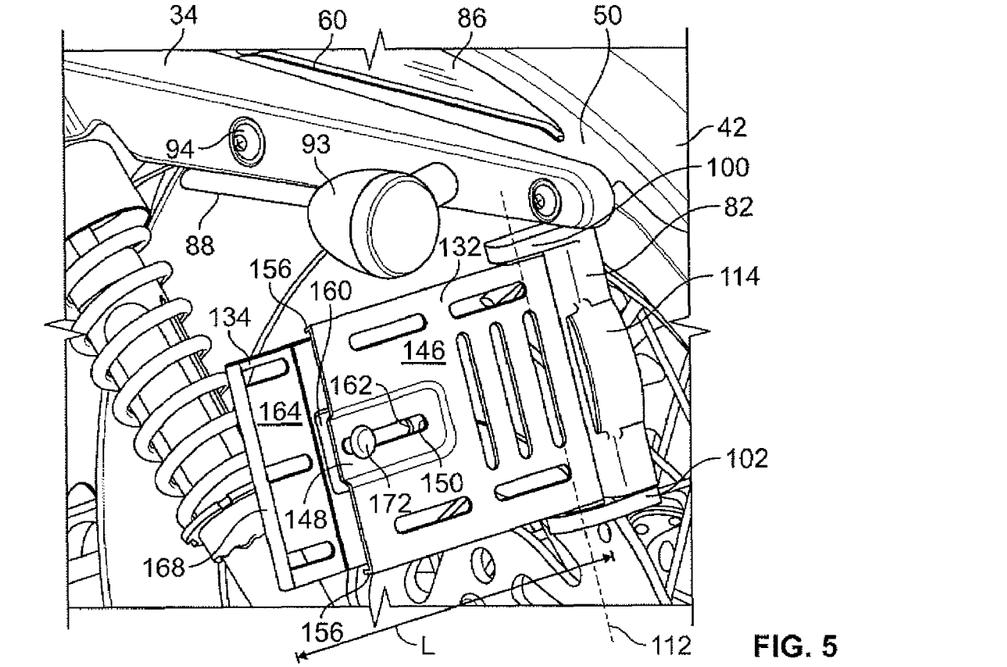
FIG. 5 is a perspective view of the license plate support of FIG. 4 coupled to the motorcycle.

The coupling member 78 includes a first portion 132 that engages the detent assembly 76 and a second portion 134 that is moveably coupled to the first portion 132 to afford adjustment of a length L of the coupling member 78 (see FIG. 5). The first portion 132 includes an upper flange portion 136 configured to engage the collar 124 of the detent assembly 76. The flange portion 136 includes a projection 138 that is received by the collar 124 and affords pivotal movement of the first portion 132 with respect to the support member 74 about the pivot axis 112. The spring 122 biases the collar 124 against the flange portion 136, in turn biasing the first portion 132 against the cam member 126.

The first portion 132 also includes a lower detent portion 140. The detent portion 140 is configured similarly to the flange portion 136 but is further provided with a cam projection 142 that extends generally downwardly for engagement with one of the cam recesses 128a, 128b, 128c. The particular cam recess 128a, 128b, 128c that receives the cam projection 142 depends upon whether the coupling member 78 is in an extended or folded position. The detent portion 140 also includes a substantially cylindrical projection 144 that is received by the cam member 126 and affords pivotal movement of the first portion 132 with respect to the support member 74 about the pivot axis 112.

Figure 6:
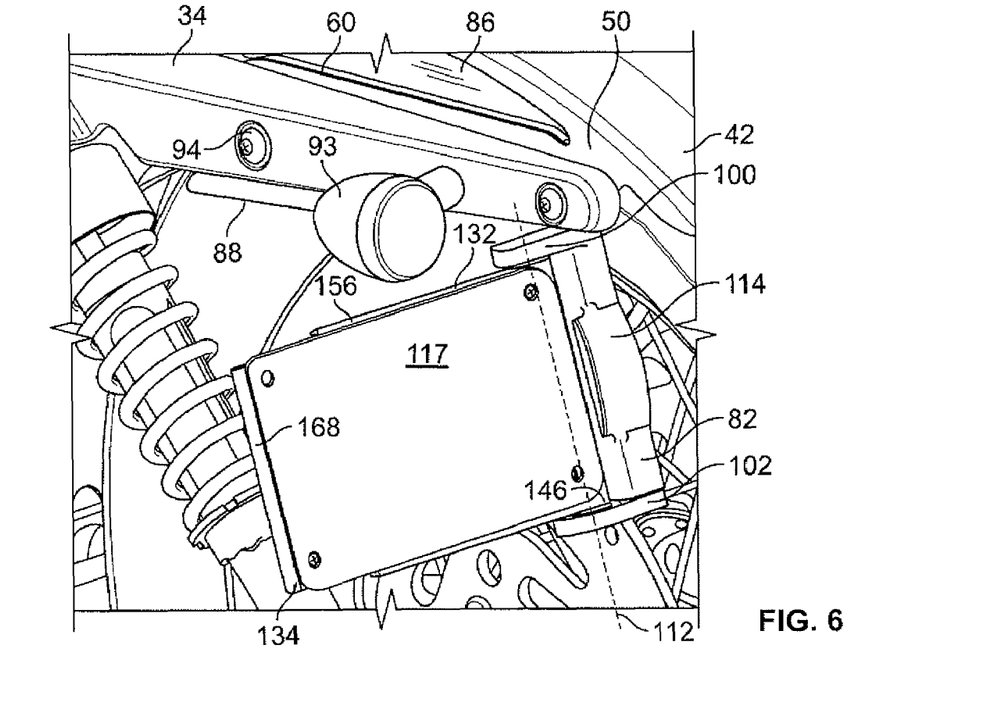
FIG. 6 is a perspective view of the license plate support of FIG. 4 with a license plate coupled thereto.

Referring also to FIGS. 5 and 6, the first portion 132 includes a substantially planar support surface 146 defining a support plane, and a first recessed portion 148 that is recessed with respect to the support surface 146. A first adjustment slot 150 is defined by the first recessed portion 148 and extends substantially perpendicularly to the pivot axis 112. Additional mounting slots 152 are defined in other portions of the first portion 132 so that license plates of different sizes and configurations can be coupled to the first portion 132. The first portion 132 also includes upper and lower edges 156 that are bent or otherwise formed to define lips extending away from the support surface 146.

The second portion 134 defines a first surface 158 (FIG. 4) that engages the first portion 132 on a side opposite the support surface 146. The second portion 134 also includes a second recessed portion 160 that receives the first recessed portion 148, and defines a second adjustment slot 162 that is alignable with the first adjustment slot 150. A second surface 164 is offset from the first surface 158 such that when the second portion 134 is coupled to the first portion 132, the second surface 164 is substantially aligned or coplanar to the support surface 146. As such, when the license plate 154 is coupled to the coupling member 78, the license plate 154 engages and is at least partially supported by the support surface 146 and the second surface 164. The second portion 134 defines a plurality of mounting slots 166, some of which can be aligned with the mounting slots 152 of the first portion 132, and a substantially J-shaped end portion 168 that receives an edge 170 of the license plate 154 (see FIG. 6).

The second portion 134 is moveable with respect to the first portion 132 to adjust the length L of the coupling member 78. In the illustrated construction, an adjustment bolt 172 extends through the first and second adjustment slots 150, 162. A nut 174 is threaded onto the bolt 172 and tightened against the second portion 134 to fix a relative position of the second portion 134 with respect to the first portion 132. Loosening of the nut 174 allows the second portion 134 to be moved with respect to the first portion 132 in a direction that is substantially perpendicular to the pivot axis 112, thereby affording adjustment of the length L of the coupling member 78. The depth of the first recessed portion 148 with respect to the support surface 146 is selected to avoid interference between the adjustment bolt 172 and the license plate 154 when the license plate 154 is coupled to the coupling member 78. The adjustable nature of the coupling member 78 is provided to accommodate differently sized license plates.

Figure 7:
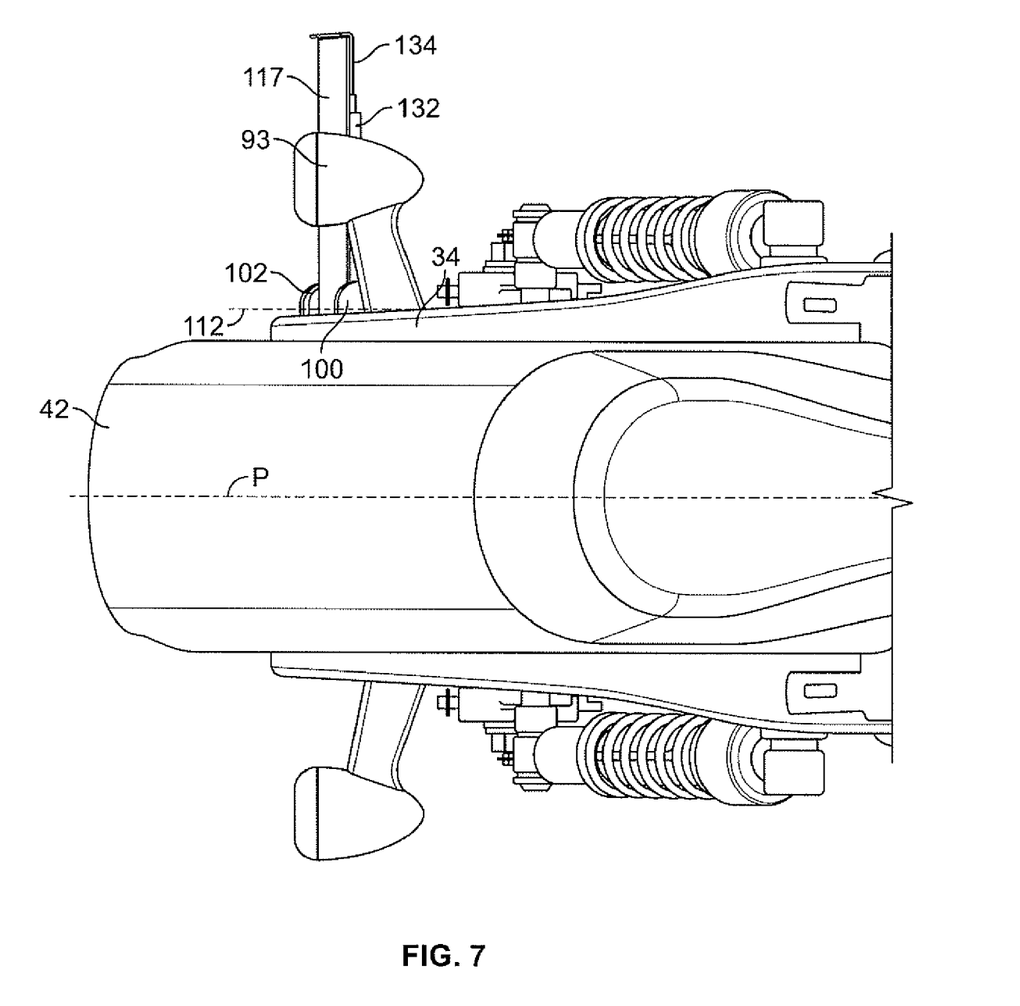
FIG. 7 is a top view of the rear portion of the motorcycle of FIG. 1 with the license plate support in an extended position.
Figure 8:
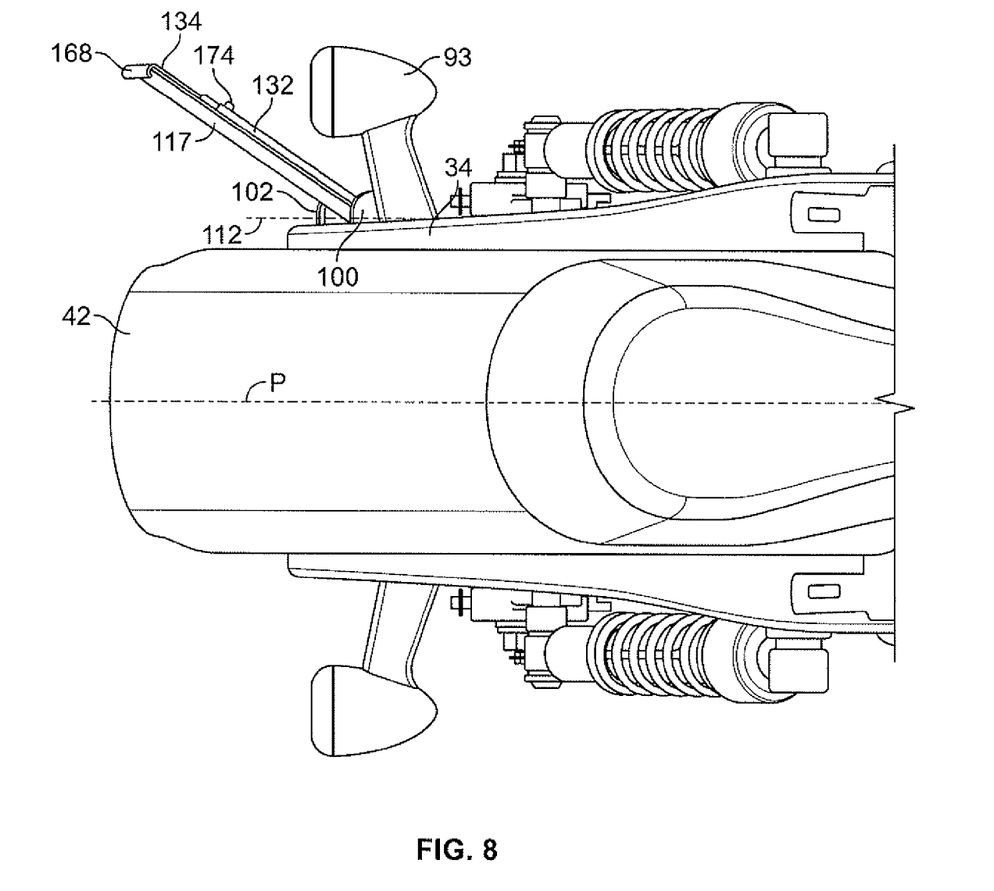
FIG. 8 is a top view similar to FIG. 7 with the license plate support in a rearwardly folded position.
Figure 9:
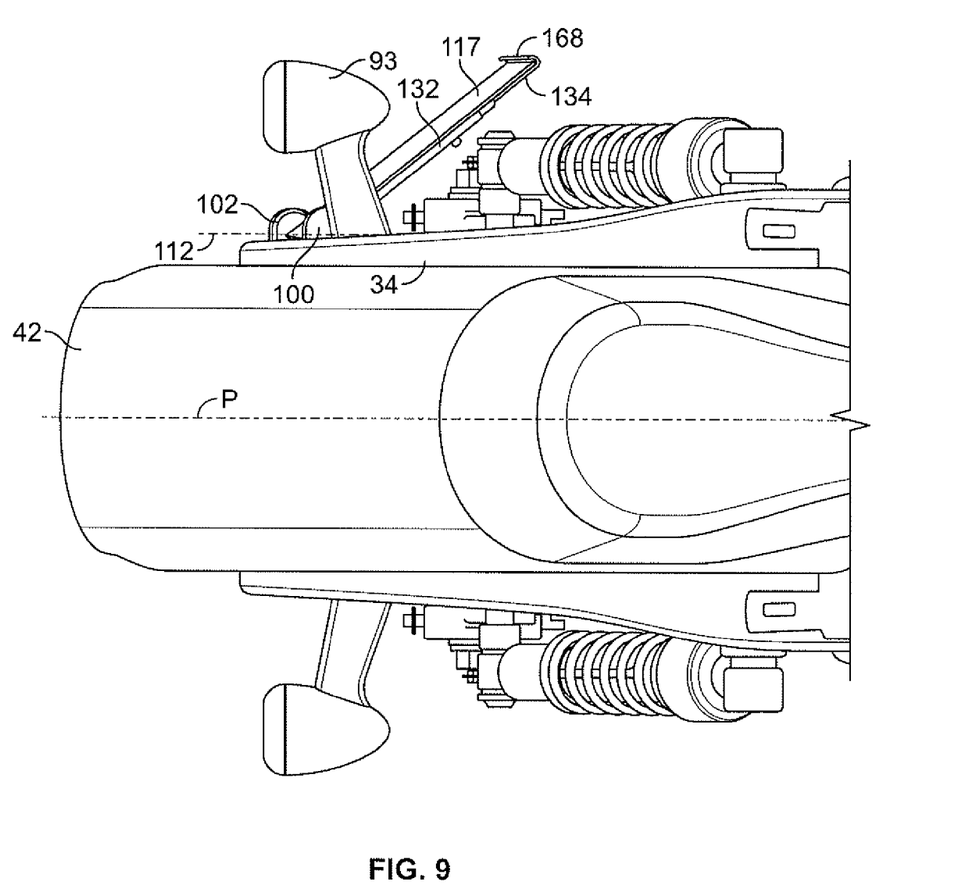
FIG. 9 is a top view similar to FIG. 7 with the license plate support in a forwardly folded position.

The flange portion 136 and the detent portion of the first portion 132 cooperate with the detent assembly 76 to provide detent pivotal movement of the coupling member 78 with respect to the support member 74. Referring also to FIGS. 7-9, in the illustrated construction the coupling member 78 is detently pivotable between an extended position (FIG. 7), a rearwardly-folded position (FIG. 8), and a forwardly-folded position (FIG. 9). As discussed above, the coupling member 78 pivots about the pivot axis 112, which is substantially parallel to a rotational plane P of the rear wheel 30.

When the coupling member 78 is in the extended position, the cam projection 142 of the detent portion 140 is received by the cam recess 128a in the cam member 126. Application of a lateral force to the coupling member 78 in a forward direction causes pivotal movement of the coupling member 78 about the pivot axis 112. Such pivotal movement in turn causes the cam projection 142 to engage angled sidewalls of the cam recess 128a, thereby urging the coupling member 78 upwardly, against the biasing force provided by the spring 122 to disengage the cam projection 142 from the cam recess 128a. The strength of the biasing force applied by the spring 122 and the relative slope of the angled sidewalls determines how much lateral force must be applied to the coupling member in order to move the coupling member 78 away from the extended position.

As the coupling member 78 pivots about the pivot axis 112, the cam projection 142 slides along the flat surface between the cam recesses 128a and 128b. When the coupling member 78 reaches the forwardly folded position, the biasing force of the spring 122 urges the cam projection 142 into engagement with the cam recess 128b. Movement of the coupling member 78 back to the extended position requires applying a lateral force to the coupling member 78 in a rearward direction to overcome the biasing force provided by the spring 122 which urges the cam projection 142 into engagement with the cam recess 128b. In this regard the coupling member 78 is detently moveable between the extended position and the forwardly folded position. Detent movement of the coupling member 78 from the extended position to the rearwardly folded position is achieved in substantially the same way, with the cam projection 142 being received by the cam recess 128c when the coupling member 78 is in the rearwardly folded direction.

The invention claimed is:

1. A motorcycle comprising:
   a frame including a front end and a rear end, the rear end including a fender support;
   a front wheel supporting a front end of the frame;
   a rear wheel supporting a rear end of the frame;
   a fender coupled to the fender support and extending over at least a portion of the rear wheel;
   a license plate support member coupled to at least one of the fender, the fender support, and the frame;
   a detent assembly coupled to the support member and including a cam member defining a first cam recess and a second cam recess; and
   a coupling member pivotably coupled to the support member by the detent assembly, the coupling member detently pivotable with respect to the support member about a pivot axis between an extended position in which the coupling member engages the first cam recess and a folded position in which the coupling member engages the second cam recess.

2. The motorcycle of claim 1, wherein the coupling member includes a first portion that engages the detent assembly and a second portion moveably coupled to the first portion to afford adjustment of a length of the coupling assembly.

3. The motorcycle of claim 2, wherein the coupling member is pivotable with respect to the support member about a pivot axis that is substantially parallel to a rotational plane of the rear wheel, and wherein the second portion is moveable in a direction that is substantially perpendicular to the pivot axis.

4. The motorcycle of claim 2, wherein the first portion includes a support surface that defines a support plane and the second portion defines a first surface that engages the first portion and a second surface that is offset from the first surface and substantially aligned with the support plane.

5. The motorcycle of claim 4, wherein the first portion includes a first recessed portion that is recessed with respect to the support surface, and wherein the second portion defines a second recessed portion that is recessed with respect to the first surface and receives the first recessed portion.

6. The motorcycle of claim 1, wherein the support member includes a first projection extending away from the fender and defining a generally downwardly-facing first cavity, and a second projection extending away from the fender and spaced from the first projection, the second projection defining a generally upwardly-facing second cavity, and wherein the first and second cavities each receive a respective portion of the detent assembly.

7. The motorcycle of claim 1, wherein the fender includes an inner surface and defines a display aperture, and wherein the support member includes a mounting surface that faces the inner surface and a display surface that is recessed with respect to the mounting surface and visible through the display aperture.

8. The motorcycle of claim 1, wherein the support member defines a first aperture that receives a first fastener that extends through the fender support and the fender, and a second aperture, the motorcycle further comprising a turn signal assembly including a mounting projection, the mounting projection extending through the fender support, the fender, and the second aperture to couple the turn signal, the support member, and the fender to the fender support.

9. The motorcycle of claim 1, further comprising a lighting assembly received by the support member and positioned adjacent the pivot axis to illuminate an area of the coupling member.

10. A rear fender assembly for a motorcycle, the motorcycle having a fender support and a license plate, the rear fender assembly comprising:
a fender coupled to the fender support, the fender including an inner surface and an outer surface and defining a fender well and a display aperture;
a license plate support member including a coupling portion coupled to the fender and a support portion depending from the coupling portion and configured to support the license plate, the coupling portion including a display surface positioned in the fender well and visible through the display aperture.

11. The rear fender assembly of claim 10, wherein the coupling portion defines a mounting surface that faces the inner surface and wherein the display surface is recessed with respect to the mounting surface.

12. The rear fender assembly of claim 10, wherein the support portion pivotably supports the license plate for movement about a pivot axis.

13. The rear fender assembly of claim 12, wherein the support portion includes spaced-apart first and second projections, the fender assembly further comprising a detent assembly supported by the projections and a coupling member pivotably supported by the detent assembly for detent movement between an extended position and a folded position, and wherein the license plate is coupled to the coupling member.

14. The rear fender assembly of claim 13, wherein the coupling member includes a first portion that engages the detent assembly and a second portion that is moveably coupled to the first portion to afford adjustment of a length of the coupling member.

15. The rear fender assembly of claim 10, wherein the fender includes a curved upper portion and substantially planar side portions, and wherein the display aperture is defined by one of the side portions.

16. The rear fender assembly of claim 10, further comprising a lighting assembly received by the support portion and positioned adjacent the pivot axis to illuminate the license plate.

17. A license plate support for a motorcycle, the license plate support comprising:
a coupling portion coupled to the motorcycle;
a support portion depending from the coupling portion, the support portion including first and second projections spaced-apart from and extending substantially parallel to one another;
a detent assembly supported by the first and second projections and including a cam member defining a first cam recess and a second cam recess; and
a coupling member pivotably coupled to the support portion by the detent assembly, the coupling member detently pivotable with respect to the support portion about a pivot axis between an extended position in which the coupling member engages the first cam recess and a folded position in which the coupling member engages the second cam recess.

18. The license plate support of claim 17, wherein the coupling member includes a first portion that engages the detent assembly and a second portion moveably coupled to the first portion to afford adjustment of a length of the coupling member.

19. The license plate support of claim 18, wherein the first projection defines a generally cylindrical first cavity and the second projection defines a generally cylindrical second cavity, the first and second cavities opening toward one another, wherein the coupling member pivots about a pivot axis that is defined by the first and second cavities, and wherein the second portion is moveable in a direction that is substantially perpendicular to the pivot axis.

20. The license plate support of claim 16, wherein the first portion includes a support surface that defines a support plane and the second portion defines a first surface that engages the first portion and a second surface that is offset from the first surface and substantially aligned with the support plane.

21. The license plate support of claim 20, wherein the first portion includes a first recessed portion that is recessed with respect to the support surface, and wherein the second portion defines a second recessed portion that is recessed with respect to the first surface and receives the first recessed portion.

22. The license plate support of claim 17, further comprising a reflector mount depending from the coupling portion and including a reflector surface facing in a direction that is substantially parallel to the first and second projections.

23. The license plate support of claim 17, wherein the coupling member includes a J-shaped end portion configured to receive an edge of the license plate.

24. The license plate support of claim 17, wherein the coupling portion includes a mounting surface that is hidden from view when the license plate support is mounted on the motorcycle, and a display surface that is recessed with respect to and substantially surrounded by the mounting surface, and wherein the display surface is visible when the license plate support is mounted on the motorcycle.

25. The license plate support of claim 17, further comprising a lighting assembly received by the support portion and positioned adjacent the pivot axis to illuminate an area of the coupling member.

* * * * *